United States Patent [19]

Shupe

[11] Patent Number: 4,886,120
[45] Date of Patent: Dec. 12, 1989

[54] PROCESS FOR SECONDARY OIL RECOVERY UTILIZING PROPOXYLATED ETHOXYLATED SURFACTANTS IN SEAWATER

[75] Inventor: Russell D. Shupe, Ponca City, Okla.

[73] Assignee: Conoco Inc., Ponca City, Okla.

[21] Appl. No.: 305,306

[22] Filed: Feb. 1, 1989

[51] Int. Cl.$^4$ .............................................. E21B 43/22
[52] U.S. Cl. .................................. 166/274; 252/8.554
[58] Field of Search ..................... 166/273, 275, 305.1; 252/8.554

[56] References Cited

U.S. PATENT DOCUMENTS

| | | | |
|---|---|---|---|
| 4,293,428 | 10/1981 | Gale et al. | 166/273 |
| 4,620,595 | 11/1986 | Schutt | 166/274 X |
| 4,690,217 | 9/1987 | Taggart et al. | 166/274 |
| 4,705,110 | 11/1987 | Balzer | 166/274 |
| 4,722,396 | 2/1988 | Balzer | 166/274 |
| 4,738,894 | 4/1988 | Jones | 166/307 X |
| 4,828,032 | 5/1989 | Teletzke et al. | 166/273 X |

FOREIGN PATENT DOCUMENTS 2158126  11/1985  United Kingdom ................ 166/275

Primary Examiner—George A. Suchfield

[57] ABSTRACT

A process for removing residual oil from the near wellbore area of a subterranean formation adjacent an injection well of a waterflood operation to improve water injectivity comprising injection through said well into said area seawater containing a surfactant having the formula:

$$RO(C_3H_6O)_7(C_2H_4O)_2YX$$

wherein:

R is a mixture of alkyl groups containing from 12 to 15 carbon atoms,
Y is sulfate group, and
X is a monovalent cation.

After the treatment to improve water injectivity, the formation is waterflooded.

6 Claims, No Drawings

PROCESS FOR SECONDARY OIL RECOVERY UTILIZING PROPOXYLATED ETHOXYLATED SURFACTANTS IN SEAWATER

BACKGROUND OF THE INVENTION

1. Field of the Invention

Much work has been done on improving the injectivity of water injection wells, i.e., the ability to inject water into an oil-containing subterranean formation through a wellbore, by the removal of residual oil from the formation pore spaces in the near wellbore area. An increase in injectivity, while not resulting in any increase in the amount of oil recovered, does serve to accelerate the rate of recovery of oil, thereby improving the economics of the waterflood process.

There is a substantial and unfulfilled need for improved techniques to increase the injectivity of water injection wells to be used in certain waterflood processes where there is a low formation permeability to water, as compared to the formation absolute permeabilty, due to the presence of residual oil in the formation pore spaces adjacent the injection wells.

2. Prior Art

U.S. Pat. No. 4,690,217 discloses improving the injectivity of a water injection well by removing residual oil from the formation in the near injection wellbore area through injection of an aqueous fluid containing a surfactant having the formula:

$$RO(C_3H_6O)_a(C_2H_4O)_bYX$$

wherein:
- R is an alkyl group containing from about 3 to about 20 carbon atoms or an alkylphenol where the alkyl portion of the alkylphenol contains from about 3 to about 20 carbon atoms or a mixture thereof,
- a has an average value between 0 and 10,
- b has an average value between about 1 and about 10,
- Y is a sulfate or sulfonate group; and
- X is a cation, preferably monovalent.

The surfactants described therein broadly encompass those useful in the present invention, but the patent does not recognize the unique properties of the specific surfactant of this invention as to its effectiveness in lowering interfacial tension between seawater and crude oil.

U.S. Pat. No. 4,293,428 discloses injecting into a formation in a waterflooding process a surfactant having the formula:

$$RO(C_3H_6O)_m(C_2H_4O)_nYX$$

wherein:
- R is a linear or branched alkyl radical, an alkenyl radical or an alkyl or alkenyl substituted benzene radical, the non-aromatic portion of the radical containing from 6 to 24 carbon atoms;
- m has an average value of from about 1 to about 10,
- n has an average value of from about 1 to about 10,
- Y is a hydrophilic group such as a sulfate or sulfonate; and
- X is a cation, preferably monovalent.

Thereafter the surfactant is driven through the formation with an aqueous fluid.

U.S. Pat. No. 4,216,098 discloses waterflooding of a subterranean hydrocarbon-bearing formation with water containing a polymer comprising repeating units of vinyl sulfonic acid alkoxylated with a mixture of ethylene oxide and propylene oxide. The weight percent ethylene oxide in the mixture is about 60 to about 95.

U.S. Pat. No. 4,406,798 discloses tertiary oil recovery with oil field brine using a surfactant of the formula:

$$R(OCH_2CH_2)_n(OCH_2CH)_mY$$
$$\phantom{R(OCH_2CH_2)_n(OCH_2CH)_m}|$$
$$\phantom{R(OCH_2CH_2)_n(OCH_2CH)_m}CH_3$$

in which:
- R is hydrogen or alkyl from 1 to 6 carbons,
- n is an integer from 10 to 40,
- m is an integer from 20 to 50, and
- Y is hydroxyl, $OSO_3M$ or $SO_3M$, where M is an alkali metal cation or ammonium.

U.S. Pat. No. 4,448,697 discloses waterflooding of a subterranean hydrocarbon-bearing formation with water containing a surfactant of the formula:

$$RO(R'O)_m(CH_2CH_2O)_nH$$

wherein:
- R is selected from the group consisting of an alkyl of 1 to 6 carbon atoms, phenyl and tolyl,
- R' is a 1,2- or 2,3-butylene radical,
- m is an integer from 1 to 40; and
- n is an integer of 10 or greater.

U.S. Pat. No. 4,738,789 discloses a carbon dioxide waterflood which includes a surfactant having the formula:

$$RO(CHCH_2O)_x(CH_2CH_2O)_yA$$
$$\phantom{RO(CHCH_2O)_x(CH_2CH_2}|$$
$$\phantom{RO(CHCH_2O)_x(CH_2CH_2}CH_3$$

wherein:
- R is an alkyl or alkylaryl radical of about $C_6$ to $C_{20}$,
- A is a radical selected from the group consisting of $-PO(OH)_2$, $-PO(OH)[OCH_2CH_2]_y[OCH_2CH(CH_3)]_xOR$, $-SO_3H$, $SO_2H$ and $-H$,
- x is a number corresponding to the degree of propoxylation; and
- y is a number corresponding to the degree of ethoxylation.

SUMMARY OF THE INVENTION

In accordance with this invention the injectivity of a water injection well is improved by injecting through the well and into the surrounding formation near the wellbore, seawater containing a surfactant having the formula:

$$RO(C_3H_6O)_7(C_2H_4O)_2YX$$

wherein:
- R is a mixture of alkyl groups containing from 12 to 15 carbon atoms,
- Y is sulfate; and
- X is a monovalent cation to remove residual oil saturation from the formation pore spaces in the near wellbore area. After the treatment to improve water injectivity, the formation is waterflooded.

DETAILED DESCRIPTION OF THE INVENTION

The surfactants used in the process of the present invention have the following formula:

$$RO(C_3H_6O)_m(C_2H_4O)_nYX$$

wherein:

R is a mixture of alkyl groups containing from 12 to 15 carbon atoms, m and n are nominally 7 and 2, respectively, as clarified below, Y is a sulfate group; and X is a monovalent cation.

Examples of suitable surfactants include compounds where R is a mixture of i-tridecyl, dodecyl, i-tetradecyl, tridecyl, i-dodecyl, pentadecyl, tetradecyl and i-pentadecyl.

X includes cations such as sodium, potassium, lithium, or ammonium. Preferred are the sodium and ammonium cations.

The surfactants having the above formula are not actually pure compounds, but rather are mixtures wherein the propylene oxide and ethylene oxide components have an average of about 7 propylene oxide units and about 2 ethylene oxide units. Thus, the propylene oxide may be present as a mixture ranging from $(C_3H_6O)_1$ to $(C_3H_6O)_{10}$ or higher. Usually the components will be concentrated, with about 90% ranging from $(C_3H_6O)_5$ to $(C_3H_6O)_9$. A similar variety of ethylene oxide components may be present. However, usually the ethylene oxide will be about 90% $(C_2H_4O)_1$ to $(C_2H_4O)_3$. The amounts of propylene oxide and ethylene oxide present in the surfactants are nominally designated as 7 moles and 2 moles, respectively, but they may vary from an average of from 6.5 to 7.5 and 1.5 to 2.5, respectively within the scope of the formula previously given for the surfactant. As used herein, the term $RO(C_3H_6O)_7(C_2H_4O)_2YX$ refers to compounds within the foregoing definition.

The surfactants used in the process of the invention are prepared in a number of ways. In one method a mixture of $C_{12}$ to $C_{15}$ alcohols is reacted with propylene oxide to yield an alkyl oxypropylene ether. The oxypropylene ether is then reacted with ethylene oxide to form an alkyl oxypropylene oxyethylene ether. This product is sulfated, followed by neutralization with a suitable base to form the desired surface-active agent. This method of preparation of the surfactants and other methods are described in detail in U.S. Pat. No. 4,293,428, which is incorporated herein by reference.

In carrying out the process of the invention in a waterflood operation, surfactant in seawater is injected into a wellbore traversing a formation containing residual oil in the formation pore spaces, in a sufficient amount to sweep the residual oil from the formation pore spaces in the area near the wellbore. Usually the wellbore area to be treated is that area extending radially outward from the wellbore for a distance of about 1 to about 20 meters.

With the particular surfactants employed herein it has been found that the concentration of surfactant in the seawater may vary from as low as 0.001 to as high as 5.0 weight percent. Preferably the concentration of surfactant will be between about 0.5 and about 3 weight percent. However, it is within the scope of the invention to use concentrations below 0.1 weight percent and still obtain effective removal of residual oil.

The success obtained in using very low concentrations of these surfactants is apparent from consideration of the measurements taken to determine the interfacial tension of these materials, particularly as compared to other conventional surfactants, as shown in Table 1 under Example 1. While many of these conventional surfactants are effective in the treatment of injection wells for the removal of residual oil saturation when used in various injection fluids, none of them demonstrate the desirable interfacial tension characteristics of the surfactants used herein when injected in seawater. In many parts of the world, seawater is the only readily available injection fluid. Thus, the use of the surfactants employed in the process of the invention is particularly applicable in these areas.

The amount of seawater with added surfactant required to sweep the residual oil from the nearby well area can be determined by those skilled in the art for each formation. However, the volume of seawater with added surfactant injected will usually be about one volume per pore volume of the near wellbore area being treated, provided that greater volumes of the injected material may be used if desired.

The following examples illustrate the results obtained in carrying out the invention.

EXAMPLE 1

Various types of surfactants were tested to determine their interfacial tension in simulated seawater (ASTM D-1141-52) against Murchison crude oil. The surfactants were added to the seawater at an active concentration of 2.0 weight percent. Interfacial tension measurements were made at a 30' C with a spinning drop interfacial tensiometer. The results of the tests are shown in Table 1.

TABLE 1

| Surfactant | Interfacial Tension, dyne/cm (10 minutes) |
| --- | --- |
| Alfonic 1012-40 ES[1] | ppt. |
| Alfonic 1412-20 ES[2] | 0.281 |
| Alfonic 1412-30 ES[3] | 0.302 |
| Alfonic 1412-40 ES[4] | ppt. |
| Alfonic 1412-40 ES[5] | 0.333 |
| Alfonic 1412-60 ES[6] | ppt. |
| Alfonic 1618-40 ES[7] | ppt. |
| Alfonic 1618-60 ES[8] | ppt. |
| Alfonic 1618-80 ES[9] | 3.1 |
| Enordet 1215-3S[10] | 0.298 |
| Dowfax 2A1[11] | 1.87 |
| Vista C-550/Alfonic 1412-30 ES[12] | 0.187 |
| Vista C-550/Alfonic 1412-40 ES[13] | 0.174 |
| Vista C-550/Alfonic 1412-60 ES[14] | 0.188 |
| Vista 600L/Alfonic 1412-40 ES[15] | ppt. |
| Enordet 1215-3P-3ES[16] | 0.151 |

TABLE 1-continued

| Surfactant | Interfacial Tension, dyne/cm (10 minutes) |
|---|---|
| Enordet 1215-7P-2ES[17] | 0.00262 |

[1]Linear alkyl alcohols of 10 to 12 carbon atoms, 40 percent ethylene oxide added and sulfated to form the ether sulfate.
[2]Linear alkyl alcohols of 12 to 14 carbon atoms, 20 percent ethylene oxide added and sulfated to form the ether sulfate.
[3]Linear alkyl alcohols of 12 to 14 carbon atoms, 30 percent ethylene oxide added and sulfated to form the ether sulfate.
[4]Linear alkyl alcohols of 12 to 14 carbon atoms, 40 percent ethylene oxide added and sulfated to form the ether sulfate.
[5]Also contains ethyl alcohol.
[6]Linear alkyl alcohols of 12 to 14 carbon atoms, 60 percent ethylene oxide added and sulfated to form the ether sulfate.
[7]Linear alkyl alcohols of 16 to 18 carbon atoms, 40 percent ethylene oxide added and sulfated to form the ether sulfate.
[8]Linear alkyl alcohols of 16 to 18 carbon atoms, 60 percent ethylene oxide added and sulfated to form the ether sulfate.
[9]Linear alkyl alcohols of 16 to 18 carbon atoms, 80 percent ethylene oxide added and sulfated to form the ether sulfate.
[10]Alkylalcohols of 12 to 15 carbon atoms with 3 moles of ethylene oxide added and sulfated to form the ether sulfate.
[11]Disulfonated mono and dialkyl diphenyl oxide.
[12]Alkylbenzene sulfonate containing linear alkyl groups of 10 to 13 carbon atoms with 3.
[13]Alkylbenzene sulfonate of 11 with 4.
[14]Alkylbenzene sulfonate of 11 with 6.
[15]Alkylbenzene sulfonate containing linear alkyl groups of 11 to 15 carbon atoms with 4.
[16]Alkyl alcohols of 12 to 15 carbon atoms with 3 moles of propylene oxide added, 3 moles of ethylene oxide added and capped by a sulfate group.
[17]Alkyl alcohols of 12 to 15 carbon atoms with 7 moles of propylene oxide added, 2 moles of ethylene oxide added and capped by a sulfate group.

It is noted from the data in Table 1 that the interfacial tension of Enordet 1215-7P-2ES is lower by several orders of magnitude than any of the other surfactants.

EXAMPLE 2

Similar tests were carried out with various Enordet surfactants and Hutton crude oil. The results are set forth in Table 2.

TABLE 2

| Surfactant | Interfacial Tension dyne/cm (10 minutes) |
|---|---|
| Enordet 1215-3P-3ES | 0.19 |
| Enordet 1215-5P-2ES | 0.076 |
| Enordet 1215-7P-2ES | 0.00584 |

Here again the surfactant with 7 moles of propylene oxide and 2 moles of ethylene oxide has a much lower interfacial tension than other similar surfactants.

EXAMPLE 3

The interfacial tension of Enordet 1215-7P-2ES was measured at various concentrations in seawater (ASTM D-1141-52) against Murchison and Hutton crude oils. The results are shown in Table 3.

TABLE 3

| Interfacial Tension dyne/cm (10 minute) | | Surfactant Concentration |
|---|---|---|
| Murchison Crude Oil | Hutton Crude Oil | Wt. % |
| 0.00110 | 0.00570 | 1.0 |
| 0.00180 | 0.00450 | 0.5 |
| 0.00060 | 0.00180 | 0.25 |
| 0.00066 | 0.00120 | 0.10 |
| 0.00250* | 0.00065 | 0.01 |
| 0.00950* | NA | 0.001 |

*60 minute values

The data shows that Enordet 1215-7P-2ES exhibits very low interfacial tension with both crude oils even at concentrations as low as 0.01 wt% of the surfactant. Also, the interfacial tension is remarkably low with Murchison crude oil at 0.001 wt % surfactant.

EXAMPLE 4

Laboratory coreflood tests were conducted at 32′ C with Enordet 1215-7P-2ES in seawater (ASTM D-1141-52) using Murchison crude oil in Berea cores. The decrease in water injection pressure, which is a measure of the efficiency of displacement of oil from the cores, was obtained in each test. The results of the tests are shown in Table 4. The test procedure employed is set forth following Table 4.

TABLE 4

| | Test | | | |
|---|---|---|---|---|
| | 1 | 2 | 3 | 4 |
| Core pore volume, $cm^3$ | 19.4 | 19.3 | 19.5 | 19.7 |
| Surfactant Concentration, wt % | 2.0 | 2.0 | 2.0 | 2.0 |
| Slug size, pore volume | 5.0 | 1.0 | 0.5 | 0.2 |
| Reduction in Core $\Delta$ P, x-fold | 5.1 | 4.5 | 5.9 | 4.1 |
| Reduction in Core $\Delta$ P, % of theoretical maximum | 86.3 | 85.6 | 89.9 | 82.7 |

Test Procedure

1. Place core in vessel maintained at 32′ C and 28 $kg/cm^2$
2. Determine liquid pore volume of core by pump injection of seawater into evacuated dry core
3. Conduct brine flood for 15 minutes at 224 $cm^3$/hr
4. Conduct oil flood for 40 minutes at 96 $cm^3$/hr
5. Let core stand for 40 days to establish native-state wettability
6. Conduct brine flood for 30 minutes at 224 $cm^3$/hr
7. Run surfactant flood and brine post-flush, each at 60 $cm^3$/hr
8. Remove core from vessel
9. Extract oil and water from core with toluene
10. Extract adsorbed surfactant from core with toluene-methanol-ammonium hydroxide solvent.

It is noted from the date in Table 4 that a large reduction of core $\Delta P$ is obtained in the tests, even with very low pore volumes of surfactant.

EXAMPLE 5

Similar coreflood tests were carried out with Enordet 1215-7P-2ES using Hutton crude oil in Berea cores. The results of the tests are presented in Table 5.

TABLE 5

| | Test | | | |
|---|---|---|---|---|
| | 1 | 2 | 3 | 4 |
| Core pore volume, $cm^3$ | 19.5 | 19.3 | 19.4 | 19.4 |
| Surfactant Concentration, wt % | 2.0 | 2.0 | 0.1 | 0.01 |
| Slug size, pore volume | 1.0 | 0.23 | 6.0 | 12.0 |
| Reduction in Core $\Delta$ P, x-fold | 5.9 | 5.2 | 4.2 | 3.1 |
| Reduction in Core $\Delta$ P, % of theoretical maximum | 88.3 | 86.3 | 81.9 | 71.0 |

It is noted from the data that a substantial reduction in core $\Delta P$ is obtained in the tests, even with very low surfactant concentrations.

While certain embodiments and details have been shown for the purpose of illustrating the present invention, it will be apparent to those skilled in the art that various changes and modifications may be made herein without departing from the spirit or scope of the invention.

I claim:

1. A process for enhancing the injectivity of an injection well and thereby accelerating the recovery of oil by a waterflood process from an oil-bearing subterranean formation penetrated by at least one injection well and at least one production well wherein the near wellbore area of the formation penetrated by the injection well has a low formation permeability to water as compared to the formation's absolute permeability, said method comprising:

(a) injecting into the formation through an injection well, seawater containing a surfactant in an amount effective to sweep the residual oil from the formation pore spaces in the near wellbore area and to thereby improve the water injectivity of said injection well, wherein the surfactant has the formula:

$$RO(C_3H_6O)_7(C_2H_4O)_2YX$$

wherein:

R is a mixture of alkyl groups containing from 12 to 15 carbon atoms,

Y is sulfate,

X is a monovalent cation; and thereafter injecting seawater into the formation through the injection well.

2. The process of claim 1 in which the cation is an alkali metal or ammonium.

3. The process of claim 2 in which the concentration of the surfactant in the seawater varies from about 0.5 to about 3 weight percent.

4. The process of claim 3 in which the amount of seawater plus surfactant injected into the wellbore is about one volume per pore volume of the near wellbore area being treated.

5. The process of claim 4 in which the cation is sodium.

6. The process of claim 5 in which the concentration of the surfactant in the seawater varies from about 0.5 to about 3 weight percent.

* * * * *